US 9,704,317 B2

(12) United States Patent
Baumgarte

(10) Patent No.: US 9,704,317 B2
(45) Date of Patent: Jul. 11, 2017

(54) LONG RANGE WIRELESS CREDENTIALS FOR ENTRYWAY

(71) Applicant: Schlage Lock Company LLC, Indianapolis, IN (US)

(72) Inventor: Joseph Wayne Baumgarte, Carmel, IN (US)

(73) Assignee: Schlage Lock Company LLC, Indianapolis, IN (US)

( * ) Notice: Subject to any disclaimer, the term of this patent is extended or adjusted under 35 U.S.C. 154(b) by 0 days.

(21) Appl. No.: 14/494,048

(22) Filed: Sep. 23, 2014

(65) Prior Publication Data

US 2016/0086406 A1     Mar. 24, 2016

(51) Int. Cl.
| | |
|---|---|
| *G06K 19/00* | (2006.01) |
| *G07C 9/00* | (2006.01) |
| *G06K 19/07* | (2006.01) |
| *G06K 7/10* | (2006.01) |

(52) U.S. Cl.
CPC ..... *G07C 9/00309* (2013.01); *G06K 7/10158* (2013.01); *G06K 19/0709* (2013.01); *G06K 19/0724* (2013.01); *G07C 9/00658* (2013.01); *G07C 9/00571* (2013.01); *G07C 2009/00579* (2013.01); *G07C 2209/63* (2013.01)

(58) Field of Classification Search
USPC .............................. 235/487, 492; 340/10, 572
See application file for complete search history.

(56) References Cited

U.S. PATENT DOCUMENTS

| | | | |
|---|---|---|---|
| 7,471,199 | B2 | 12/2008 | Zimmerman et al. |
| 8,310,344 | B2 | 11/2012 | Geiszler et al. |
| 8,390,456 | B2 | 3/2013 | Puleston et al. |
| 8,432,285 | B2 | 4/2013 | Rofougaran et al. |

(Continued)

FOREIGN PATENT DOCUMENTS

WO     2008007871 A1     1/2008

OTHER PUBLICATIONS

International Search Report; International Searching Authority, US Patent and Trademark Office; International Application No. PCT/US2015/051685; Jul. 5, 2016; 3 pages.

(Continued)

*Primary Examiner* — Matthew Mikels
(74) *Attorney, Agent, or Firm* — Taft Stettinius & Hollister LLP

(57) ABSTRACT

An access control system having one or more system antennas that are configured to emit a first signal having a first frequency that is detected by the credential device. The credential device is configured to harvest electrical power from at least a portion of the detected first signal. At least a portion of the harvested electrical power may be used by the credential device to transmit a second signal to a reader device, the second signal containing information indicative of a credential stored on the credential device. Further, the second signal has a second frequency that is different than the first frequency of the first signal. The reader device and/or a server may evaluate the transmitted credential to determine whether the credential is associated with an authority to operate the reader device, such as, for example, an authority to unlock a lock mechanism of the reader device.

20 Claims, 2 Drawing Sheets

(56) References Cited

U.S. PATENT DOCUMENTS

| | | | |
|---|---|---|---|
| 2004/0263319 A1* | 12/2004 | Huomo | G06K 19/0716 340/10.2 |
| 2005/0052283 A1 | 3/2005 | Collins et al. | |
| 2006/0252366 A1* | 11/2006 | Eu | A01K 1/0017 455/3.06 |
| 2007/0120678 A1* | 5/2007 | Posamentier | 340/572.7 |
| 2008/0290990 A1 | 11/2008 | Schaffzin et al. | |
| 2009/0009295 A1 | 1/2009 | Rofougaran | |
| 2009/0303007 A1 | 12/2009 | Ryou et al. | |
| 2010/0123004 A1* | 5/2010 | Felkel et al. | 235/382 |
| 2013/0176107 A1 | 7/2013 | Dumas et al. | |
| 2014/0376428 A1* | 12/2014 | Verma | H04L 5/0023 370/297 |
| 2015/0045991 A1* | 2/2015 | Schwitters | B60W 30/00 701/2 |

OTHER PUBLICATIONS

Written Opinion; International Searching Authority, US Patent and Trademark Office; International Application No. PCT/US2015/051685; Jul. 5, 2016; 3 pages.

* cited by examiner

LONG RANGE WIRELESS CREDENTIALS FOR ENTRYWAY

BACKGROUND

Embodiments of the present application generally relate a wireless credential access control system. More particularly, embodiments of the present invention relate to a wireless credential access control system that utilizes wireless transmissions using a first signal to provide power to a credential device, and wireless transmissions using a second signal for operation of a reader device, and wherein the second signal has a frequency that is different than a frequency of the first signal.

Security management systems often utilize hardware, such as, for example, reader devices, including electronic lock devices, to control the ingress and/or egress through an entryway. In at least certain applications, operation of the reader device often requires that a user retrieve a credential, such as, for example, a card or badge, among other credentials, and position the credential in relatively close proximity the reader device. For example, a user may retrieve a credential from the user's wallet, purse, key chain, or necklace, and then, once retrieved, position the credential within a couple inches of, or against, the reader device. Information on the presented credential may then be received by the reader device and evaluated to determine whether the credential is authorized to operate the reader device, such as, for example, unlock an electronic lock. Thus, operation of the credential device typically requires the user to not only retrieve the credential, but to also actively address the reader device by positioning the credential within a relatively close proximity to, or against, the reader device.

BRIEF SUMMARY

An aspect of the present invention is a method for communicating a credential from a credential device to a reader device. The method includes detecting, by the credential device, a first signal that uses a first frequency. Electrical power from the detected first signal is harvested by the credential device and used in transmitting a second signal from the credential device to the reader device. Additionally, the second signal provides information relating to the credential, and uses a second frequency that is different than the first frequency.

Another aspect of the present invention is a wireless credential access control system that includes at least one system antenna that is adapted to emit a first signal that has a first frequency. The access control system also includes at least one credential device that has at least one antenna and a processing device. The at least one antenna is configured to detect the first signal. Additionally, the at least one credential device is configured to harvest energy from the detected first signal to provide power for at least the transmission of a credential from the at least one credential device via a second signal, the second signal having a second frequency that is different than the first frequency of the first signal.

Another aspect of the present invention is a wireless credential access control system that includes at least one system antenna that is adapted to emit a first signal that has a first frequency. The access control system further includes at least one credential device having a first antenna that is adapted to detect the first signal. Additionally, the at least one credential device is configured to harvest energy from at least a portion of the first signal that is detected by the first antenna. The at least one credential device is also adapted to transmit a credential via a second signal using the harvested energy, the second signal having a second frequency that is different than the first frequency of the first signal. The access control system further includes a reader device having a reader antenna, a processing device, and a lock mechanism. The reader antenna is configured to receive the second signal transmitted from the at least one credential device. Additionally, the reader device is adapted to evaluate the credential transmitted from the at least one credential device and to place the lock mechanism in an unlocked position based on an outcome of the evaluation of the credential.

Other aspects of the present invention will become apparent by consideration of the detailed description and accompanying drawings.

Figure 1:
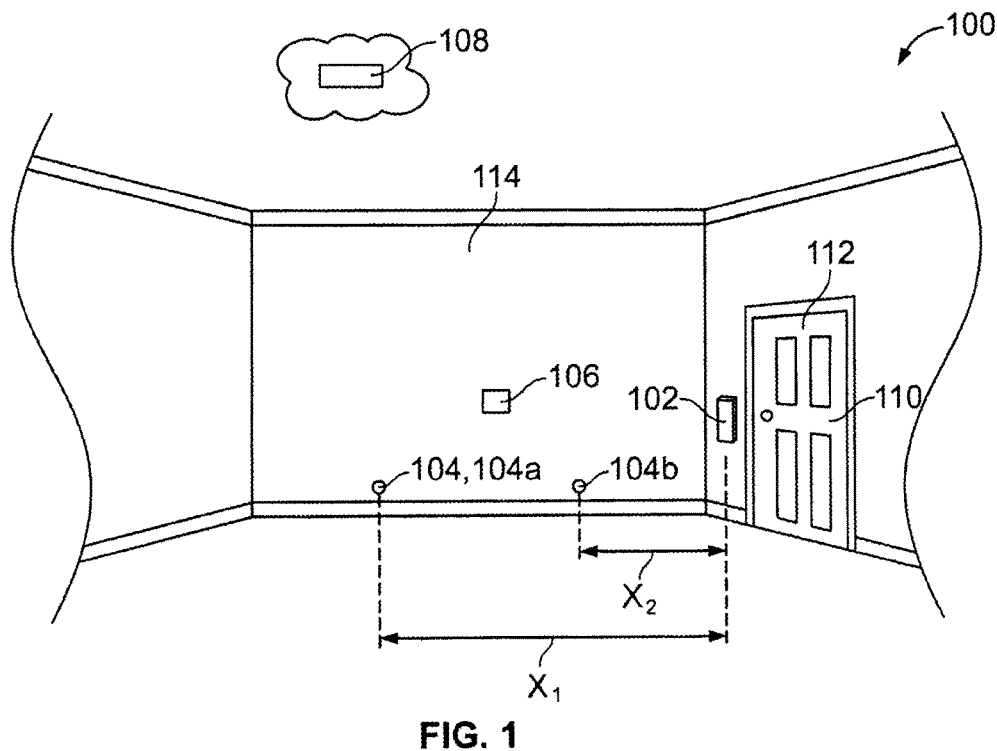
FIG. 1 illustrates a schematic diagram of an exemplary wireless credential access control system that includes a reader device, a credential device, a system antenna, and a server according to an illustrated embodiment of the present invention.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DESCRIPTION OF THE ILLUSTRATED EMBODIMENTS

FIG. 1 illustrates a schematic diagram of an exemplary wireless credential access control system 100 that includes one or more reader devices 102, one or more system antennas 104, at least one credential device 106, and a server 108, according to an illustrated embodiment of the present invention. According to certain embodiments, the access control system 100 may control the ability to open a barrier 110, such as, for example, a door or gate, from a locked, closed position to an unlocked, open position so as to allow passage through, or access to, the entryway 112. According to certain embodiments, the access control system 100 may or may not include different types of reader devices 102 and/or different types of credential devices 106. According to certain embodiments, the system antenna(s) 104 is configured to emit a first signal having a first frequency that is detected by the credential device 106, and which is used in inducing an electrical current in the credential device 106. Moreover, the credential device 106 may be configured to harvest energy from the detected first signal, with the harvested energy providing power to at least assist in the credential device 106 being able to provide information to the reader device 102 over at least a second signal, the second signal having a second frequency that is different than the first frequency of the first signal.

According to certain embodiments, the one or more system antennas 104 may be configured to emit the first signal using radio frequency (RF) techniques. For example, according to certain embodiments, the first signal emitted from the system antenna 104 may be an electromagnetic signal having a first frequency that is received or otherwise detected and harvested by the credential device 106. The system antenna 104 may be positioned at a variety of locations, such as, for example, in a wall 114 of a room that has an entryway 112 through which access/passage is controlled by the reader device 102. Moreover, one or more of the system antennas 104 may be positioned at a variety of locations within the room, including, for example, in a sidewall, floor, and/or ceiling. Further, the system antenna 104 may be configured to provide minimal, if any, interference with the architectural detail or aesthetic appearance of the surrounding environment and/or components. For example, according to certain embodiments, the system antenna 104 may be obscured from view, or otherwise configured to at least relatively assimilate to surrounding components, such as the molding of the associated room and/or entryway 112. Further, according to certain embodiments, one or more of the system antennas 104 may be an antenna of the reader device 102.

The number of system antennas 104 employed may depend on a variety of different criteria, including, for example, the size of the system antennas 104 and the range of transmission of the first signal from the system antennas 104. Further, as discussed below, according to certain embodiments, a plurality of system antennas 104 may be positioned in relatively close proximity to the credential device 106, which may improve the strength of the power supplied to the credential device 106 via the first signal. Additionally, the system antennas 104 may be positioned so that the credential device 106 is continuously provided with access to power via signals emitted from the system antennas 104 as the credential device 106 is moved into closer proximity to the reader device 102. Additionally, the system antennas 104 may be used for conveying energy by far or near fields.

Figure 2:
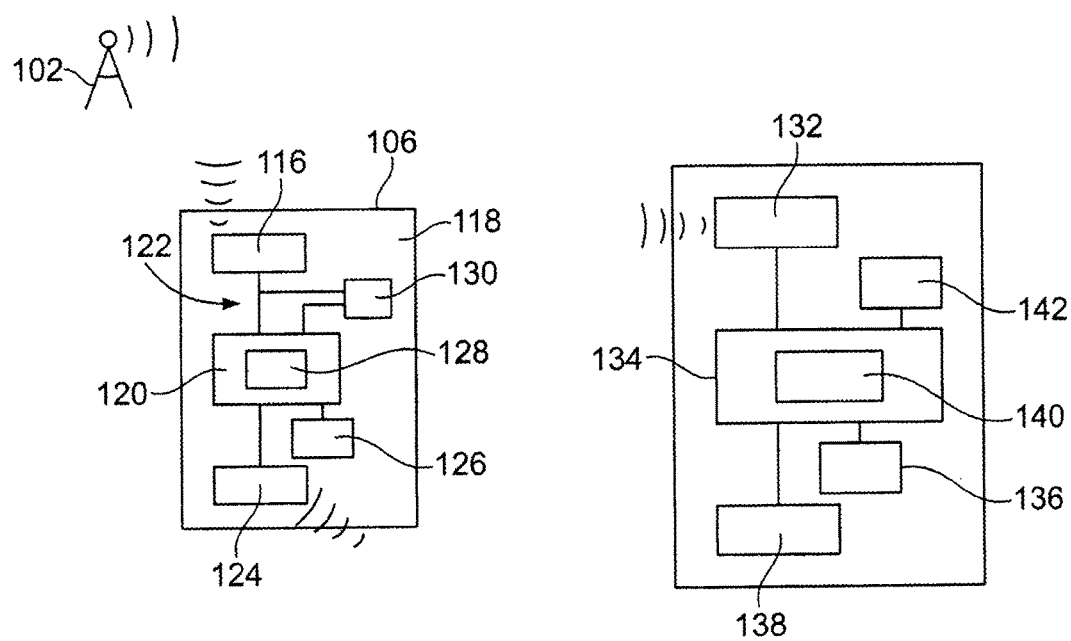
FIG. 2 illustrates a schematic diagram of a credential device and a reader device according to an illustrated embodiment of the present invention.

Referencing FIGS. 1 and 2, the credential device 106 may have a variety of different forms, including, for example, being an identification card or badge, key fob, or other security device used to secure information that is used in connection with authorization to pass through an entryway 112 via the operation of the reader device 102. According to certain embodiments, the credential device 106 may include a first antenna 116 that may be a passive, semi-passive, or active transceiver that may or may not be housed, embedded, or otherwise secured to a substrate 118. Additionally, according to certain embodiments, the first antenna 116 may be operably connected to a processing device 120. Further, according to certain embodiments, the antenna 116 and processing device 120 may comprise at least a portion of a passive, semi-passive, or active RFID transponder tag 122.

According to certain embodiments, the first antenna 116 may be configured to at least capture electromagnetic energy emitted from the system antenna 104 via the first signal. According to such embodiments, the electromagnetic energy captured by the first antenna 116 may be harvested by the credential device 106 to provide electrical power to at least assist in the operation of the credential device 106. For example, according to certain embodiments, energy harvested by the credential device 106 from the energy captured from the first signal may at least assist in providing power for the transmission of one or more signals from the credential device 106 to the reader device 102 using a second signal, the second signal having a second frequency that is different than the first frequency of the first signal. Additionally, such transmission from the credential device 106 to the reader device 102 may be emitted from the first antenna 116, or by a another, second antenna 124.

A variety of different types of antennas may be used for the first antenna 116 and/or the second antenna 124 of the credential device 106. For example, according to certain embodiments, either or both the first antenna 116 and the second antenna 124 may be a transceiver, including, for example, an active or passive transceivers. For example, according to certain embodiments, the first antenna 116 may be a first antenna or transceiver for at least receiving electromagnetic energy emitted via at least a first signal, and the second antenna may be a second transceiver for receiving communications using a bandwidth wireless communication protocol, including, for example, Bluetooth (including Bluetooth low energy), Zigbee, Near Field Communication (NFC), and/or IEEE 802.15, among other communication protocols. Further, the second signal may use a wireless communication protocol, such as, for example, a low bandwidth wireless communication protocol, and has a second frequency that is different than the first frequency of the first signal.

According to certain devices, the second signal may operate over a relatively greater distance than the first signal. For example, according to certain embodiments, the first signal may be an electromagnetic signal that allows the first antenna 116 to receive and harvest a signal that is emitted from a system antenna 104 that is positioned about 1 feet to about 10 feet, and more specifically, from about 2 feet to about 5 feet, from the credential device 106, while the second signal may allow reader device 102 to communicate with the credential device 106 from a farther distance, such as, for example, from a distance of about 100 feet or more. Such distances may be selected to allow for the communication of credentials of the credential device 106 to the reader device 102 and verification of those communicated credentials before the credential device 106 is presented to the reader device 102 and/or before the user of the credential device 106 reaches or otherwise attempts to gain access through the associated entryway 112. Thus, according to certain embodiments, the system antennas 104 may be placed in relatively close proximity to potential pathways of the user that has the credential device 106, but also at an outer transmission range of the second signal relative to the reader device 102. Such a configuration may allow the credential device 106 to receive power via the first signal that is emitted from system antenna 104 when the credential device 106 comes within transmission range of second signal relative to the reader device 102, thereby allowing for the communication and verification of the credentials of the credential device 106 before the user and credential device 106 reach the reader device 102 and/or the associated entryway 112.

The credential device 106 may also include a memory 126 that may or may not be part of the processing device 120. Further, according to certain embodiments, the processing device 120 may be a read-write microchip or a read-only microchip. Additionally, according to certain embodiments, the memory 126 may store credential information relating to the authorization of the credential device 106 to operate the reader device 102 and/or authority to gain passage through the entryway 112. In the depicted form, the processing device 120 is of a programmable variety that executes algorithms and processes data in accordance with operating logic 128 as defined by programming instructions (such as software or firmware) stored in the memory 126. Alternatively or additionally, the operating logic 128 is at least partially defined by hardwired logic or other hardware. The processing device 120 may include one or more components of any type suitable to process the signals received from the first antenna 116 or elsewhere, and to provide desired output signals for transmission from the first antenna 116 or another, second antenna 124. Such components may include digital circuitry, analog circuitry, or a combination of both.

According to certain embodiments in which the first antenna 116 is a passive or semi-passive transceiver and/or the credential device 106 includes a passive or semi-passive RFID transponder tag 122, the credential device 106 may include a power storage device 130, such as, for example, a battery or capacitor, among other power storage devices. The power storage device 130 may store energy, at least momentarily, that is harvested from the energy received by the first antenna via the first signal. Such stored energy may be used for a variety of different operations, including, for example, storing information in the memory 126 of the credential device 106 and/or operation of the processing device 120. Additionally, such stored energy may, or may not, be used with other energy harvested by the credential device 106 in the communication of information relating to the credential device 106 to the reader device 102, such as, for example, the transmission of credential information via the first or second 116, 124 to the reader device 102 using a second signal.

The reader device 102 may be a reader, a lock, a payment terminal, and/or any other type of device that is configured to communicate with the credential device 106 to receive a credential, or other secret or secure data for processing. According to certain embodiments, the reader device 102 is an electronic lock device having one or more reader antennas 132, a processing device 134, a memory 136, and a lock mechanism 138, such as, for, example, bolt and/or latch. According to certain embodiments, at least one reader antenna 132 may be a system antenna 104 that emits a signal using the first signal that is used to provide power for the operation of the credential device 106. Additionally, the memory 136 of the reader device 102 may include a local database that may be configured to store an access log, location, type identifier, and/or any other information relating to the operation of and/or access permissions for, the reader device 102. The reader device 102 may further include non-transitory computer executable instructions to perform various operations on the reader device 102, such as, for example, functionality to lock and unlock the lock mechanism 138, verify access permissions associated with the credential received by the reader device 102 from the credential device 106, and update the local database stored in the memory 136, among other operations.

According to certain embodiments, the reader device 102 may include a reader antenna 132 that is configured for communication with the credential device 106, the server 108, and/or other transmitters using the second signal. As previously discussed, the second signal may be used for communications using one or more wireless protocols, such as, for example, a bandwidth wireless protocol, a carrier frequency, or a network band, among other protocols. Additionally, according to certain embodiments, the reader antenna 132 may be adapted to operate on multiple protocols, such as, for example, multiple carrier frequencies or network bands.

A variety of different types of processing devices 134 may be used for the reader device 102, such as, for example, a programmable, dedicated, and/or hardwired state machine, or any combination thereof. The processing device 134 of the reader device 102 may further include multiple processors, such as, for example, Arithmetic-Logic Units (ALUs), Central Processing Units (CPUs), Digital Signal Processors (DSPs), or the like. Processing devices 134 with multiple processing units may also utilize distributed, pipelined, and/or parallel processing. The processing device 134 may also be dedicated to performance of just the operations described herein or may be utilized in one or more additional applications. In the depicted form, the processing device 134 is of a programmable variety that executes algorithms and processes data in accordance with operating logic 140 as defined by programming instructions (such as software or firmware) stored in the memory 136 of the reader device 102. Alternatively or additionally, the operating logic 140 is at least partially defined by hardwired logic or other hardware. The processing device 134 may include one or more components of any type suitable to process the signals received from an input/output device 142 of the reader device 102, such as, for example, a keypad, or elsewhere, and to provide desired output signals. Such components may include digital circuitry, analog circuitry, or a combination of both.

The memory 136 of the reader device 102 may be included with the processing device 134 and/or coupled to the processing device 134. Further, the memory 136 may be of one or more types, such as a solid-state variety, electromagnetic variety, optical variety, or a combination thereof. Additionally, the memory 136 can be volatile, nonvolatile, or a combination thereof, and some or all of the memory 136 can be of a portable variety, such as a disk, tape, memory stick, cartridge, or the like. In addition, according to certain embodiments, the memory 136 can store data that is manipulated by the operating logic 140 of processing device 134, such as data representative of signals received from and/or sent to the input/output device 142 in addition to, or in lieu of, storing programming instructions defining the operating logic 140.

The server 108 may include one or more servers that may communicate with the reader device 102 in a variety of different manners, including, for example, over a wide area network (WAN) (e.g. the Internet), a cellular data network, a local area network (LAN), or any combination thereof. According to certain embodiments, at least one server 108 is a cloud-based server. However, a variety of other different types of servers may also be used for the server 108, including, for example, a web-based server. Further, according to certain embodiments, different servers may be used for different purposes, such as, for example, a cloud-based server for installation, maintenance, and/or management of, or relating to, the access control system 100, the reader device 102, and/or the credential device 106, and another, different server, such as, for example, a web-based server, for other purposes, such as, for example, general, day-to-day usage and/or operation of the reader device 102 and/or the credential device 106.

The server 108 may be configured to store a variety of different information, including, for example, user lists, access logs, and information related to each credential device 106, such as, for example, access permissions for each credential device 106 corresponding to each user in the user lists, a location, status, and/or type identifiers for each credential device 106 and/or reader device 102, and/or any other information for the system 100. The server 108 may further include non-transitory computer executable instructions to perform various operations in the form of an application. The various operations may include, but are not limited to, functionality to manage the reader device 102, verifying access permissions received from the credential devices 106 at each reader device 102, and updating the server 108 user lists, access permissions, adding and/or removing reader devices 102 for/from the system 100, among other operations.

Figure 3:
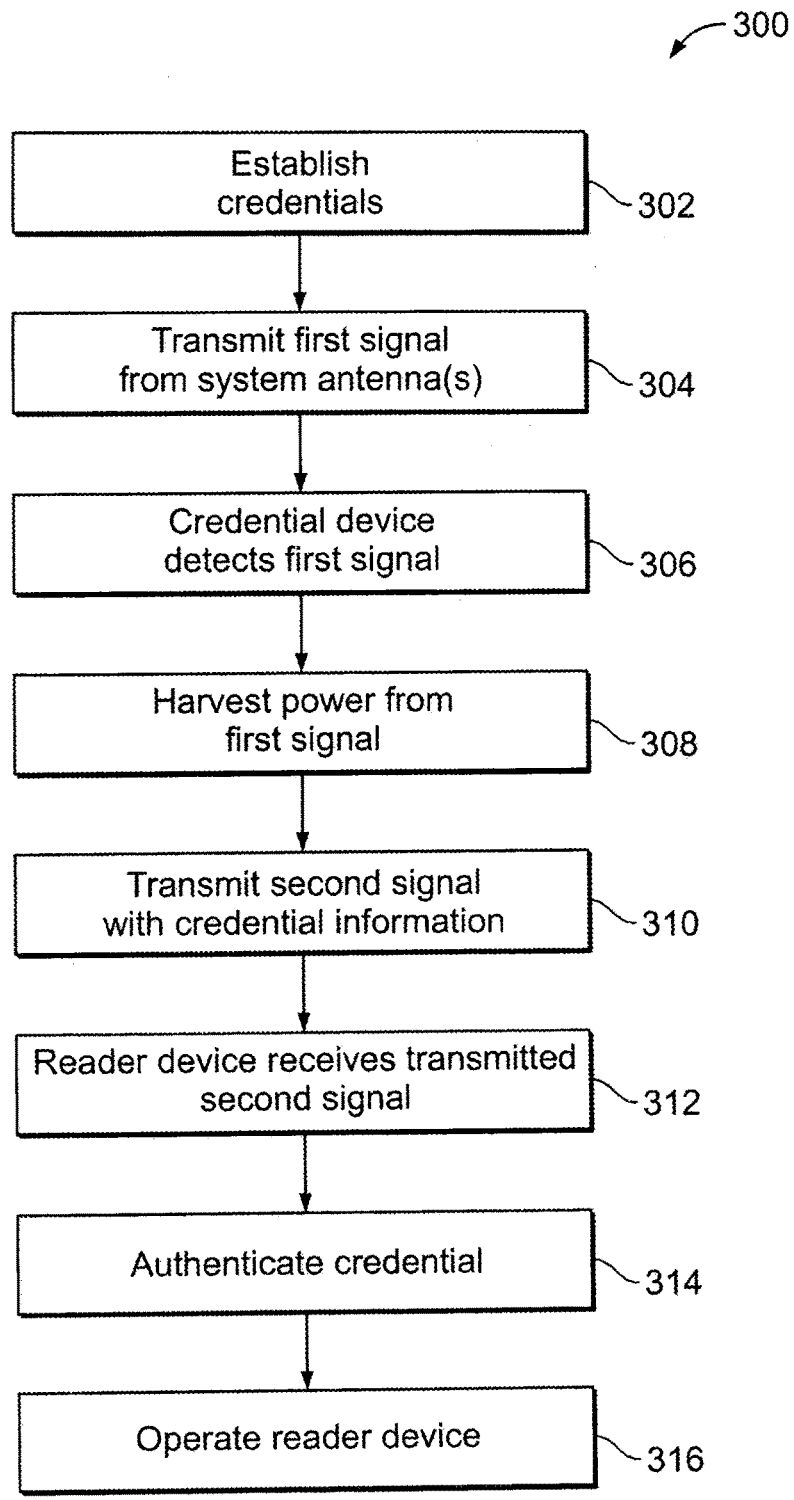
FIG. 3 illustrates a schematic diagram of an exemplary process for conducting a transmission between a credential device and a reader device according to an illustrated embodiment of the present invention.

FIG. 3 illustrates a schematic diagram of an exemplary process 300 for conducting a transmission between the credential device 106 and the reader device 106. Operations illustrated for all of the processes in the present application are understood to be examples only, and operations may be combined or divided, and added or removed, as well as re-ordered in whole or in part, unless explicitly stated to the contrary.

At step 302, credentials may be established granting the credential device 106, and/or the associated user, authority and/or the requisite permission level to operate one or more reader devices 102 of the access control system 100. For example, according to certain embodiments, such as, for example, embodiments in which the processing device 120 and/or memory 126 of the credential device 106 is a read-only device, the credential device 106 may be assigned an identifier, such as, for example, a serial number, that may be stored in the memory 126 of the credential device 106. That identifier may also be provided to the server 108 and/or the memory 136 of the reader device 102 with an indication that that identifier has authorization to operate the reader device 102 and/or authorization to gain access through the entryway 112. Thus, according to certain embodiments, when the reader device 102 detects, or is otherwise provided with, credentials having that identifier, the reader device 102 may access the memory 136 of the reader device 102 and/or the server 108 to determine whether the identifier is, or is not, associated with a grant of authority to operate the reader device 102 and/or to gain access through the entryway 112. If the reader device 102 and/or server determine that identifier is associated with a grant of authority to operate the reader device 102, then, according to certain embodiments, the reader device 102 may operate the associated lock mechanism 138 so that the lock mechanism 138 is in an unlocked position, thereby allowing for access to, or through, the associated entryway 112.

According to other embodiments, the server 108 and/or reader device 102 may provide a credential(s) that is stored on the memory 126 of the credential device 106 that is associated with a grant of authority to operate the reader device 102 and/or to gain access to/through the associated entryway 112. For example, according to certain embodiments in which the processing device 120 of the credential device 106 is a read-write device, the server 108 and/or reader device 102 may provide a credential(s), which may or may not be partially or completely encrypted, that is stored on the memory 126 of the credential device 106. When the reader device 102 detects, or is otherwise provided with that credential(s) from the credential device 106, the reader device 102 and/or server 108 may perform steps necessary to determine whether the credential(s) grant authority to operate the reader device 102 and/or to pass through the entryway 112. Such steps may include decrypting encrypted information of the credential and/or evaluating the credential(s) in terms of information stored in the memory 136 of the reader device 102 and/or the server 108, among other steps.

At step 304, one or more of the system antennas 104 may emit an electronic signal via a first signal, such as, for example, am electromagnetic signal via a radio frequency (RF), that is used to provide at least some power or energy to the credential device 106. As previously discussed, according to certain embodiments, for example, the first signal may have a relatively short range, which may assist in the quantity of power delivered to the credential device 106 using the first signal. Moreover, according to certain embodiments, the credential device 106 may be in closer proximity to the system antenna 104 than the credential device 106 is to the reader device 102 when the credential device 106 at least initially receives power via detection of the first signal. Such a configuration may allow the credential device 106 to communicate with the reader device 102, and subsequently receive authorization to pass through the entryway 112, before the credential device 106 and/or associated user reaches the reader device 102 and/or the associated entryway 112. Further, according to certain embodiments, one or more system antennas 104 may be positioned along the pathway to the entryway 112 so that the credential device 106 continues to receive power via detection of the first signal as that credential device 106 and/or user continues to move toward the reader device 102 and/or the entryway 112. For example, referencing FIG. 1, the credential device 106 may receive power from a first system antenna 104a when the credential device 106 is $x_1$ away from the reader device 102, and from a second system antenna 104b when the credential device 106 is $x_2$ away from the reader device, with $x_1$ being a distance that is greater than $x_2$. Additionally, according to certain embodiments, the distance $x_1$ may be about the same as the maximum range for transmissions between the reader device 102 and the credential device 106 using the second signal.

At step 306, the first signal emitted from the system antennas 104 may be detected by the first antenna 116 of the credential device 106 and at least a portion of the detected first signal harvested by the credential device 106 to provide power or energy for the operation of the credential device 106. According to certain embodiments, as previously discussed, at least a portion of the energy that is harvested by the credential device 106 may be at least temporarily stored by the power storage device 130 of the credential device 106.

At step 308, using the power harvested from the first signal and/or from the power storage device 130, the credential device 106 may retrieve the credential(s) from the memory 126 of the credential device 106. Again, such credential(s) may provide an indication of a grant of authority and/or permission levels associated with the credential device 106. At step 310, using power harvested from the received first signal and/or power from the power storage device 130, the credential device 106 may transmit a second signal having, or otherwise indicative of, the credential(s) to the reader device 102. As discussed above, the second signal may have a frequency that is different than the frequency of the first signal. Further, the second signal may be emitted from the credential device 106 using the first antenna 116 that was used to detect the first signal, or via another, second antenna 124.

At step 312, the reader device 102 may receive the credential(s) transmitted from the credential device 106 using the second signal. At step 314, the reader device 102 may authenticate the received credential(s). Such authentication may include evaluating whether the received credential is associated with a grant of authorization to pass through the associated entryway 112 and/or operate the reader device 102, such as, for example, cause the lock mechanism 138 to be placed in the unlocked position. Again, such evaluation may involve accessing information stored on the reader device 102, such as, for example, in the memory 136, or may involve communications with the server 108. If the evaluation indicates that the credential(s) is associated with the authorization to operate the reader device 102, then at step 316, the reader device 102 may be operated, such as, for example, the lock mechanism 138 of the reader device 102 being placed in the unlocked position.

Various features and advantages of the present invention are set forth in the following claims. Additionally, changes and modifications to the described embodiments described herein will be apparent to those skilled in the art, and such changes and modifications can be made without departing from the spirit and scope of the present invention and without diminishing its intended advantages. While the present invention has been illustrated and described in detail in the drawings and foregoing description, the same is to be considered illustrative and not restrictive in character, it being understood that only selected embodiments have been shown and described and that all changes, equivalents, and modifications that come within the scope of the inventions described herein or defined by the following claims are desired to be protected.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method for communicating a credential from a credential device to a reader device, the method comprising:
transmitting, from a first system antenna that is physically separate from the reader device by at least a first distance, a first signal having a first frequency, the first signal being detectable by the credential device at a distance no greater than the first distance away from the first system antenna;
detecting, by the credential device, the first signal;
harvesting, by the credential device, electrical power from the detected first signal;
transmitting, by the credential device and using at least in part the harvested electrical power, a second signal from the credential device, the second signal providing the credential to the reader device, the second signal having a second frequency that is different than the first frequency;
detecting, by the reader device, the transmitted second signal at least when the credential device is at the second distance away from the reader device that is greater than the first distance, the reader device being at a distance away from the first system antenna by a distance that is greater than the first distance such that the first signal is undetected by the reader device; and
unlocking, by the reader device, a lock mechanism after detection of the credential of the second signal.

2. The method of claim 1, wherein the first signal is an electromagnetic signal.

3. The method of claim 2, wherein the second signal uses a low bandwidth wireless communication protocol.

4. The method of claim 3, wherein the low bandwidth wireless communication protocol is at least one of the following: Bluetooth, Zigbee, Near Field Communication, or IEEE 802.15.

5. The method of claim 2, further including the steps of:
transmitting, from at least one second system antenna, at least one third signal having the first frequency, the first system antenna and the at least one second system antenna positioned for the credential device to selectively continuously harvest electrical power from at least one of the first signal and the at least one third signal at least until the completion of the step of unlocking the lock mechanism;
detecting, by the reader device, the transmitted credential in the detected second signal; and
evaluating the authentication of the received credential.

6. The method of claim 5, wherein the step of evaluating the authentication of the received credential is performed by the reader device, and wherein the step of unlocking the lock mechanism is in response to an outcome of the evaluation of the authentication of the received credential.

7. A wireless credential access control system comprising:
at least one system antenna adapted to emit a first signal, the first signal having a first frequency;
at least one credential device having at least one antenna and a processing device, the first signal being detectable by the at least one antenna at no greater than a first distance from the at least one system antenna, the at least one credential device configured to harvest energy from the first signal to provide power for at least the transmission of a credential stored on the at least one credential device via a second signal, the second signal having a second frequency that is different than the first frequency of the first signal; and
a reader device having a lock mechanism, the reader device being physically separate from the at least one system antenna by at least a distance that is greater than the first distance such that the first signal is undetected by the reader device, the reader device structured to receive the transmission of the second signal at least when the at least one credential device is separated from the reader device by a distance that is greater than the first distance.

8. The wireless credential access control system of claim 7, wherein the reader device includes at least one reader antenna and a processing device, the reader device configured to receive the second signal from the credential device via the at least one reader antenna, the reader device further adapted to evaluate the credential to determine whether the credential indicates an authority to operate the reader device.

9. The wireless credential access control system of claim 8, wherein the reader device is configured to, when the evaluation of the credential indicates authority to operate the reader device, place the lock mechanism in an unlock position.

10. The wireless credential access control system of claim 9, wherein the first signal is an electromagnetic signal.

11. The wireless credential access control system of claim 10, wherein the second signal uses a low bandwidth wireless communication protocol.

12. The wireless credential access control system of claim 11, wherein the at least one antenna of the credential device includes a first antenna configured to detect the first signal, and a second antenna to transmit the second signal.

13. The wireless credential access control system of claim 11, wherein the at least one system antenna comprises a plurality of system antennas positioned to continuously supply electrical power for the credential device as the credential device is both (1) at a distance no greater than the first distance from at least one of the plurality of system antennas, and (2) displaced toward the reader deceive from a distance away from the reader device that is greater than the first distance.

14. A wireless credential access control system comprising:
  at least one system antenna adapted to emit a first signal no greater than a first distance from the at least one system antenna, the first signal having a first frequency;
  at least one credential device having a first antenna adapted to detect the first signal, the at least one credential device configured to harvest energy from at least a portion of the first signal that is detected by the first antenna, the at least one credential device further adapted to transmit a credential via a second signal to a distance away from the at least one credential device that is greater than the first distance using the harvested energy, the second signal having a second frequency that is different than the first frequency of the first signal; and
  a reader device having a reader antenna, a processing device, and a lock mechanism, the reader antenna configured to receive the second signal transmitted from the at least one credential device at least when the credential device transmits the second signal from a distance away from the reader device that is greater than the first distance, the reader device being adapted to evaluate the credential transmitted from the at least one credential device and to place the lock mechanism in an unlocked position based on an outcome of the evaluation of the credential, the reader device being physically separate from the at least one system antenna by at least a distance that is greater than the first distance such that the first signal is undetected by the reader device.

15. The wireless credential access control system of claim 14, wherein the first signal is an electromagnetic signal and the second signal uses a low bandwidth wireless communication protocol.

16. The wireless credential access control system of claim 15, wherein the second signal is transmitted by a second antenna of the at least one credential device.

17. The wireless credential access control system of claim 15, wherein the lock mechanism includes a bolt or latch that is retracted when the lock mechanism is in the unlocked position.

18. The wireless credential access control system of claim 17, wherein the at least one system antenna comprises a plurality of system antennas positioned to continuously provide electrical power for the credential device as the credential device is displaced toward the reader device from a distance away from the reader device that is greater than the first distance.

19. The wireless credential access control system of claim 17, further including a server that is communicatively coupled to the reader device.

20. The wireless credential access control system of claim 17, wherein the reader device includes a local database containing access permission information.

* * * * *